J. V. RAMSEY.
COFFEE POT.
APPLICATION FILED APR. 25, 1911.

1,046,013.

Patented Dec. 3, 1912.
2 SHEETS—SHEET 1.

Witnesses
J. C. Simpson
Francis Boyle

Inventor
Jennie V. Ramsey
By Chandler & Chandler
Attorneys

J. V. RAMSEY.
COFFEE POT.
APPLICATION FILED APR. 25, 1911.
1,046,013.
Patented Dec. 3, 1912.
2 SHEETS—SHEET 2.
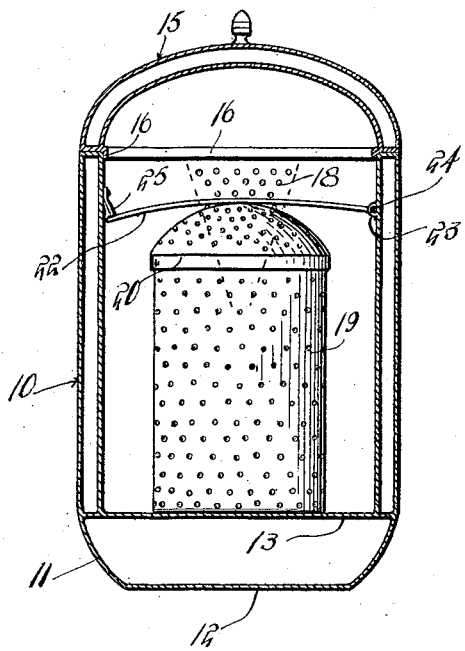
Fig. 3.
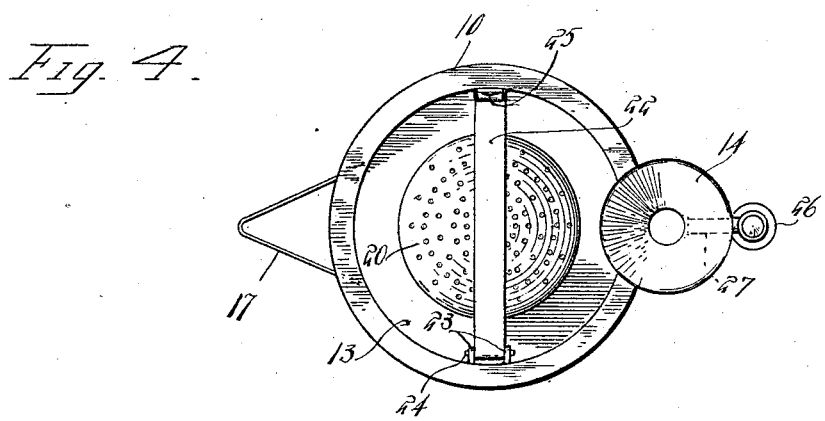
Fig. 4.
Witnesses
J. C. Simpson
Francis Boyle
Inventor
Jennie V. Ramsey
By
Attorneys
COLUMBIA PLANOGRAPH CO., WASHINGTON, D. C.

UNITED STATES PATENT OFFICE.

JENNIE V. RAMSEY, OF RONAN, MONTANA.

COFFEE-POT.

1,046,013.

Specification of Letters Patent.

Patented Dec. 3, 1912.

Application filed April 25, 1911. Serial No. 623,207.

*To all whom it may concern:*

Be it known that I, JENNIE V. RAMSEY, a citizen of the United States, residing at Ronan, in the county of Missoula, State of Montana, have invented certain new and useful Improvements in Coffee-Pots; and I do hereby declare the following to be a full, clear, and exact description of the invention, such as will enable others skilled in the art to which it appertains to make and use the same.

This invention relates to tea and coffee pots, more particularly to coffee pots and has for its primary object to provide a coffee pot having a double walled body within which is contained the coffee holding strainers and which is designed to contain water for making the infusion, the double walls of the body serving to prevent dissipation of heat as in ordinary coffee pots.

A further object of the invention is to provide a coffee pot having a single walled reservoir below the body, this reservoir being equipped with an upstanding funnel by means of which the reservoir is filled, this reservoir being designed to rest directly upon the stove and by virtue of its single wall the water within the reservoir is quickly brought up to the boiling point and the heat from this boiling water radiates through the single wall of the reservoir and raises the temperature of the water in the coffee pot to the boiling point in a minimum time and with minimum expenditure of fuel since the double walls of the body prevent radiation of heat therefrom.

A still further object of the invention is to provide the coffee pot body interiorly with a hinged clamp for positively holding the outermost strainer of the coffee strainers in stationary position within the body so that danger of the strainer impinging against the pot cover when the coffee is being poured and accidental displacement of the cover are positively prevented.

With the above objects in view the invention consists in certain novel details of construction and combination of parts hereinafter fully described and claimed, it being understood that various modifications may be made in the minor details of construction within the scope of the appended claim.

Figure 1:
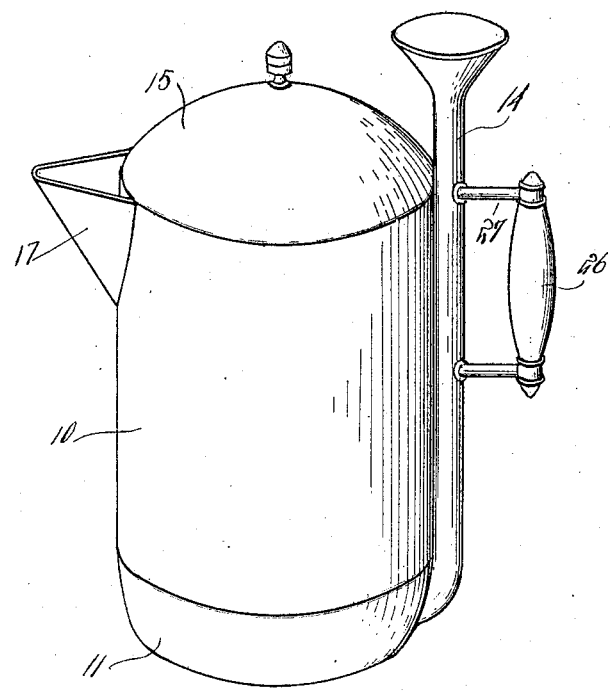
Figure 2:
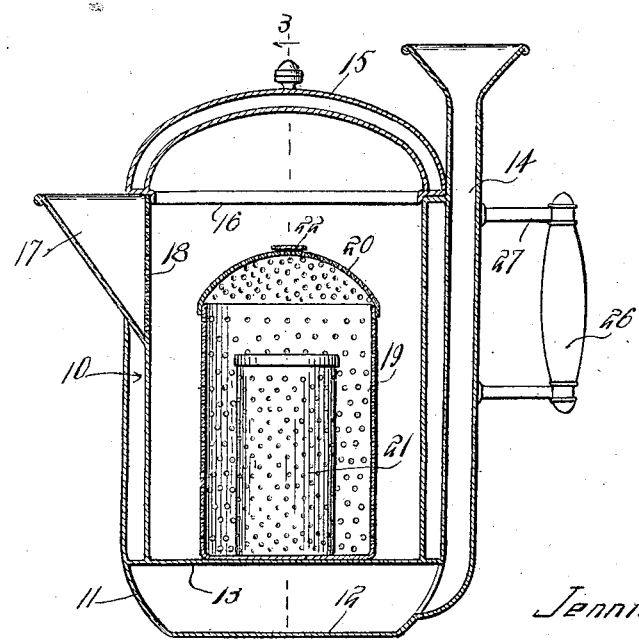

In the accompanying drawing forming part of this specification:—Figure 1 is a perspective view of a coffee pot embodying my improvements. Fig. 2 is a longitudinal sectional view through the coffee pot. Fig. 3 is a longitudinal sectional view taken on the line 3—3 Fig. 2. Fig. 4 is a plan view of the coffee pot with the cover removed.

Referring now to the drawing in which like characters of reference designate similar parts, a coffee pot is shown including a cylindrical double walled body 10, and formed integral with the body is a single walled reservoir 11 the lower wall 12 of which is designed to bear directly upon the stove and is curved upwardly and merges with the outer wall of the body. The top wall 13 of the reservoir forms a partition between the double walled body and single walled reservoir, this partition permitting of the free radiation of heat from water in the reservoir raised to the boiling point to the interior of the body. The interior of the body is designed to contain water for making the infusion as will hereinafter appear and by virtue of a continuous air space existing between the inner and outer walls of the body, heat from the water within the body is positively prevented from radiation so that the boiling point is reached by the water within the body in a minimum time and with a minimum expenditure of fuel.

The reservoir is equipped with an upstanding funnel 14 which extends along and is preferably formed integral with the outer wall of the body, and through this funnel the water supply in the reservoir may be replenished from time to time as required. A double walled cover 15 is provided having its inner wall equipped with a flange 16 which is designed to enter the coffee pot body and frictionally engage the inner wall thereof, this flange preventing accidental displacement of the cover. By virtue of the cover being double walled, an air space exists between both walls of the cover and prevents radiation of heat from the cover. The coffee pot body is provided with the usual delivery spout 17 a perforated diaphragm 18 closing the intake end of the spout and preventing the escape of grounds.

Arranged within the coffee pot body is a cylindrical perforated strainer can 19, the can being closed by a removable cover 20, and within this can is carried a second smaller but similarly constructed cylindrical strainer can 21. This inner strainer can is designed to receive the ground coffee, and upon water being poured into the coffee pot body the water passes through the strainers and saturates the coffee thus making the infusion. Coffee grounds escaping through the inner strainer can are caught by and retained within the outer strainer can so that the coffee will come forth from the coffee pot free from grounds.

It is clear that means must be employed for preventing tumbling around of the strainer cans within the coffee pot body. To attain this end, I employ a clamp 22 which is in the nature of a single straight arm, and one end of this arm is inserted between spaced perforated hinge ears 23 arranged upon the inner wall of the pot body, a pintle 24 being passed through the ears and end of the clamp for hingedly mounting the clamp. The clamp is of sufficient length to extend transversely across the pot body and is positioned at such a height from the bottom of the pot body as to bear forcibly upon the cover of the outermost strainer can. A resilient catch 25 is riveted, soldered, or otherwise secured to the inner wall of the pot body diametrically opposite from the hinge ears and is designed to bear upon the extreme free end of the clamp and retain the latter in closed position, manual depression of this catch permitting of the arm being rocked upwardly within the can body for removal of the strainer cans. The clamp when rocked closed clamps the outermost strainer can stationary to the bottom of the coffee pot bottom and positively prevents tumbling around of the can within the body so that accidental displacement of the cover during pouring of the coffee is obviated.

To facilitate manipulation of the coffee pot a cylindrical grip 26 is provided with parallel spaced legs 27 which are soldered, riveted, or otherwise secured to the funnel.

What is claimed, is:—

A coffee pot including a body having an outer and an inner wall with an air space therebetween, a single walled reservoir having a bottom wall curving upwardly and integral with said outer wall and having a top wall forming a partition which connects said inner and outer side walls and forms a bottom for said body, an upstanding filling tube connected to said reservoir, a strainer can within said body, and a clamp hinged to said inner wall and extending transversely across said body, and operating to clamp said can to said top wall.

In testimony whereof, I affix my signature, in presence of two witnesses.

JENNIE V. RAMSEY.

Witnesses:
ALBERT RAMSEY,
C. A. STONE.

---

Copies of this patent may be obtained for five cents each, by addressing the "Commissioner of Patents, Washington, D. C."